United States Patent
Song et al.

(10) Patent No.: US 12,149,647 B2
(45) Date of Patent: Nov. 19, 2024

(54) ROLL-SLIDE MOBILE TERMINAL

(71) Applicant: LG ELECTRONICS INC., Seoul (KR)

(72) Inventors: In Su Song, Seoul (KR); Timothy Kang, Seoul (KR); Min Soo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 17/632,917

(22) PCT Filed: Aug. 6, 2019

(86) PCT No.: PCT/KR2019/009797
§ 371 (c)(1),
(2) Date: Feb. 4, 2022

(87) PCT Pub. No.: WO2021/025197
PCT Pub. Date: Feb. 11, 2021

(65) Prior Publication Data
US 2022/0279058 A1    Sep. 1, 2022

(51) Int. Cl.
*H04M 1/02*    (2006.01)
*G06F 1/16*    (2006.01)

(52) U.S. Cl.
CPC ........ *H04M 1/0235* (2013.01); *G06F 1/1624* (2013.01); *G06F 1/1652* (2013.01); *H04M 1/0268* (2013.01); *H04M 2201/38* (2013.01)

(58) Field of Classification Search
None
See application file for complete search history.

(56) References Cited

U.S. PATENT DOCUMENTS

| | | | |
|---|---|---|---|
| 8,385,055 B2 * | 2/2013 | Kao ...................... | G06F 1/1616 361/679.04 |
| 8,493,714 B2 * | 7/2013 | Visser ................. | H04M 1/0237 361/679.01 |

(Continued)

FOREIGN PATENT DOCUMENTS

| | | |
|---|---|---|
| EP | 3 702 880 A1 | 9/2020 |
| KR | 10-2010-0028343 A | 3/2010 |

(Continued)

*Primary Examiner* — Tuan A Tran
(74) *Attorney, Agent, or Firm* — Birch, Stewart, Kolasch & Birch, LLP

(57) ABSTRACT

In a roll-slide mobile terminal having a flexible display in which a front area is expanded or reduced, in order to solve a problem that the flexible display is not stably supported when expanded, there is provided a roll-slide mobile terminal comprising a first frame, a second frame configured to slidably move in a first direction with respect to the first frame, a display part configured to be flexible, having a front surface provided on a front surface of the first frame, wound at an end portion in a first direction of the second frame, and provided over a rear surface of the second frame, wherein a front surface area is expanded or retracted in response to a movement of the second frame, and an expansion support part configured to expand in the first direction in response to an expansion of the front surface area of the display part to support the front surface area of the display part.

14 Claims, 11 Drawing Sheets

(56) References Cited

U.S. PATENT DOCUMENTS

| | | | | |
|---|---|---|---|---|
| 8,711,566 B2* | 4/2014 | O'Brien | ................ | G06F 1/1652 |
| | | | | 361/724 |
| 8,873,225 B2* | 10/2014 | Huitema | ................ | G09F 9/301 |
| | | | | 345/169 |
| 9,195,272 B2* | 11/2015 | O'Brien | .............. | H04M 1/0268 |
| 9,743,537 B2* | 8/2017 | Kim | ...................... | G06F 1/1652 |
| 9,877,400 B2* | 1/2018 | Wang | ................... | H05K 7/1401 |
| 10,025,355 B2* | 7/2018 | Bohn | ................ | G06F 1/1624 |
| 10,140,947 B2* | 11/2018 | Song | ....................... | G09F 9/301 |
| 10,448,521 B2* | 10/2019 | Seo | ..................... | H05K 1/0203 |
| 10,488,959 B2* | 11/2019 | Aurongzeb | ........... | G06F 1/1679 |
| 10,499,515 B2* | 12/2019 | Lee | ........................ | G06F 1/1624 |
| 10,553,135 B2* | 2/2020 | Lee | ........................ | G09F 9/301 |
| 10,747,269 B1* | 8/2020 | Choi | ................... | H04M 1/0237 |
| 10,789,863 B2* | 9/2020 | Song | ...................... | H05K 1/189 |
| 10,868,897 B2* | 12/2020 | Cha | ....................... | G06F 1/1624 |
| 10,881,009 B2* | 12/2020 | Jiang | ..................... | H05K 5/0017 |
| 11,720,141 B2* | 8/2023 | Kim | ...................... | G06F 1/3209 |
| | | | | 345/173 |
| 2012/0161876 A1* | 6/2012 | Leong | ..................... | G05F 3/262 |
| | | | | 330/288 |
| 2014/0211399 A1* | 7/2014 | O'Brien | ................ | G06F 1/1652 |
| | | | | 29/592.1 |
| 2015/0153777 A1* | 6/2015 | Liu | ........................ | G06F 1/1643 |
| | | | | 345/173 |
| 2017/0364119 A1* | 12/2017 | Lee | ........................ | G06F 1/1652 |
| 2018/0014417 A1* | 1/2018 | Seo | ........................ | H05K 1/189 |
| 2018/0103550 A1* | 4/2018 | Seo | ........................ | H01F 7/0205 |
| 2018/0103552 A1* | 4/2018 | Seo | ..................... | H05K 5/0017 |

FOREIGN PATENT DOCUMENTS

| | | |
|---|---|---|
| KR | 10-2010-0057531 A | 5/2010 |
| KR | 10-2018-0006533 A | 1/2018 |
| KR | 10-2019-0020000 A | 2/2019 |
| KR | 10-2019-0062855 A | 6/2019 |
| KR | 10-2019-0077107 A | 7/2019 |
| WO | WO 2008/140308 A1 | 11/2008 |
| WO | WO 2013/033479 A2 | 3/2013 |

* cited by examiner (a)

(b)

(c)

(d)

(a)

(b)

(c)

(d)

ROLL-SLIDE MOBILE TERMINAL

CROSS REFERENCE TO RELATED APPLICATIONS

This application is the National Phase of PCT International Application No. PCT/KR2019/009797, filed on Aug.6, 2019, which is hereby expressly incorporated by reference into the present application.

TECHNICAL FIELD

The present disclosure relates to a mobile terminal, and to a roll-slide mobile terminal having a flexible display and capable of expanding the size of a screen.

BACKGROUND ART

A display device is a device having a function of receiving, processing and displaying an image that a user may watch. For example, the display device receives a broadcast selected by a user among broadcast signals transmitted from a broadcast station, separates an image signal from the received signals, and again displays the separated image signal on a display.

Recently, due to the development of broadcasting technology and network technology, functions of the display device have also diversified considerably, and performance of the device has been improved accordingly. That is, display devices have been developed to provide not only broadcast contents but also various other contents to user. For example, the display devices may provide not only program received from a broadcasting station but also game play, music listening, Internet shopping, user-customized information, and the like using various applications. In order to perform such extended functions, a display device is basically connected to other devices or networks using various communication protocols, and may provide a user with ubiquitous computing environment. That is, the display device has evolved into a smart device that enables connectivity to a network and the ubiquitous computing.

Along with this, as network technology develops and infrastructure expands in recent years, many tasks or specialized tasks may be performed on display devices or smart devices. Accordingly, a display device having a large screen has become a form corresponding to this. However, existing large screen display device has a problem in that it is not suitable for carrying because the size and weight of the display device increase.

As an example to meet this need, a method of extending a display only when necessary by applying a flexible display folded or rolled with sufficient elasticity to a mobile terminal may be considered. That is, a portion of an area of the flexible display is wound on the back or inside of a mobile terminal, and the wound area is unwound or moved as needed so that the flexible display area visible on a front surface of the mobile terminal is widened.

However, when the display area is expanded or retracted, a frame of the mobile terminal may also be expanded or retracted, and yet, it is not easy that the display provided on the variable frame is stably supported. The necessity is further emphasized when considering the material characteristics of the flexible display, which may easily vary its shape.

DISCLOSURE OF INVENTION

Technical Goals

An aspect of the present disclosure is to solve the problem that an existing mobile terminal has limited scalability, or conversely, has an unnecessarily large size.

Further, another aspect of the present disclosure is to solve the problem of wrinkles on a folding area of an existing in-folding or out-folding mobile terminal.

Further, another aspect of the present disclosure is to solve the problem that a flexible display is not stably supported when expanded.

Further, another object of the present disclosure is to solve a problem of insufficient space inside a mobile terminal that may occur by forming a support structure of a flexible display.

Technical Solutions

According to an aspect, there is provided a roll-slide mobile terminal comprising a first frame, a second frame configured to slidably move in a first direction with respect to the first frame, a display part configured to be flexible, having a front surface provided on a front surface of the first frame, wound at an end portion in a first direction of the second frame, and provided over a rear surface of the second frame, wherein a front surface area is expanded or retracted in response to a movement of the second frame, and an expansion support part configured to expand in the first direction in response to an expansion of the front surface area of the display part to support the front surface area of the display part.

According to another aspect, there is provided a roll-slide mobile terminal, wherein the expansion support part comprises: a main member including a supporting surface that supports a rear surface of the front surface area of the display part, a middle member that is drawn out from the main member in the first direction and includes a supporting surface that supports a rear surface of the front surface area of the display part, and a sub member that is drawn out from the middle member in the first direction and includes a supporting surface that supports a rear surface of the front surface area of the display part.

According to another aspect, there is provided a roll-slide mobile terminal, wherein the front surface area of the display part comprises: a fixed area that is maintained at a front surface regardless of an expansion or a retraction of the front surface area, and a variable area that varies according to an expansion or a retraction of the front surface area, and wherein the main member supports the fixed area, and the middle member or the sub member supports the variable area.

According to another aspect, there is provided a roll-slide mobile terminal, wherein the main member and the sub member are in a shape of a rectangular parallelepiped case in which surfaces facing each other in a mutually drawing-in direction are opened, the sub member is drawn into a space formed by the main member, and the middle member is drawn into a space formed by the sub member.

According to another aspect, there is provided a roll-slide mobile terminal, wherein the expansion support part further comprises: a first guide part including a first guide rail and a first protrusion provided on facing surfaces of the main member and the middle member to guide drawing-out of the middle member, and a second guide part including a second guide rail and a second protrusion provided on facing surfaces of the sub member and the middle member to guide drawing-out of the main member.

According to another aspect, there is provided a roll-slide mobile terminal further comprising a middle frame coupled and fixed to the first frame to support the fixed area, and a back plate that is bendable and supports the variable area, wherein a rear surface forms a same plane as a rear surface of the middle frame, wherein the first guide rail and the second guide rail include a curved part that is bent in a thickness direction, so that when the sub member is fully drawn out, supporting surfaces of the main member, the middle member and the sub member form a same plane to support the rear surface of the middle frame and a rear surface of the back plate.

According to another aspect, there is provided a roll-slide mobile terminal further comprising a roller that is provided in the second frame to move along with the second frame and rotates while supporting a wound area of the display part.

According to another aspect, there is provided a roll-slide mobile terminal further comprising a slider that is fixed to a rear surface area of the display part and slidably moves on the second frame according to an expansion or a retraction of the front surface area of the display part.

According to another aspect, there is provided a roll-slide mobile terminal, wherein, in a state that the sub member and the middle member are fully drawn out, adjacent boundaries of supporting surfaces of the respective members have inclined surfaces or inclined and curved surfaces corresponding to each other.

According to another aspect, there is provided a roll-slide mobile terminal further comprising a driving part that provides a force to draw out the sub member from the main member, wherein the driving part comprises: a driving motor and a gear part provided in the first frame, and a gear rack provided in the sub member and engages with the gear part, and the gear rack forms a slope in an area corresponding to the curved part.

According to another aspect, there is provided a roll-slide mobile terminal wherein, in a second direction perpendicular to the first direction and parallel to the front surface area of the display part, the first guide part is provided on one side in the second direction, the second guide part is provided on another side in the second direction, the middle member and the main member are provided on the one side to be adjacent to each other, and the middle member and the sub member are provided on the another side to be adjacent to each other.

According to another aspect, there is provided a roll-slide mobile terminal further comprising a driving part configured to provide a force to draw out the sub member from the main member, wherein the driving part comprises a driving motor and a gear part provided in the first frame, and a gear rack that is provided in the first direction in the sub member to engage with the gear part and converts a rotational motion of the gear part into a linear motion, and the main member is fixed to the first frame and the second frame is fixed to the sub member.

According to another aspect, there is provided a roll-slide mobile terminal, wherein the expansion support part further comprises a first elastic body compressed in the first direction and disposed between the main member and the middle member, and a second elastic body compressed in the first direction and disposed between the middle member and the sub member.

According to another aspect, there is provided a roll-slide mobile terminal, wherein the first elastic body and the second elastic body are each provided in plural in a second direction perpendicular to the first direction and parallel to the front surface area of the display part.

According to another aspect, there is provided a roll-slide mobile terminal, wherein the expansion support part is provided in an area of an internal space formed by the first frame and the second frame, and an electrical part is formed within a remaining area of the internal space.

Effects

The roll-slide mobile terminal of the present disclosure may be used by changing the size of the mobile terminal or the size of the display as needed by expanding or retracting the display output area.

In addition, since a bended point of the flexible display is not always fixed, durability of the flexible display may be improved.

In addition, since the flexible display may be stably supported when expanded, a touch input to the display may be easily performed, and the possibility of damage to the display due to an external force is reduced.

In addition, by preventing the variable supporting structure of the flexible display from occupying a lot of space in the mobile terminal, the space for an electrical part may be sufficiently secured.

In addition, even though the supporting structure of the flexible display is variable, a front surface supporting the display may form the same plane, so that an uneven space is not generated between the display and the supporting structure.

Further scope of applicability of the present disclosure may become apparent from the following detailed description. However, it should be understood that specific embodiments such as detailed descriptions and example embodiments are given as mere examples since various changes and modifications within the spirit and scope of the present disclosure may be clearly understood by those skilled in the art.

Figure 11:
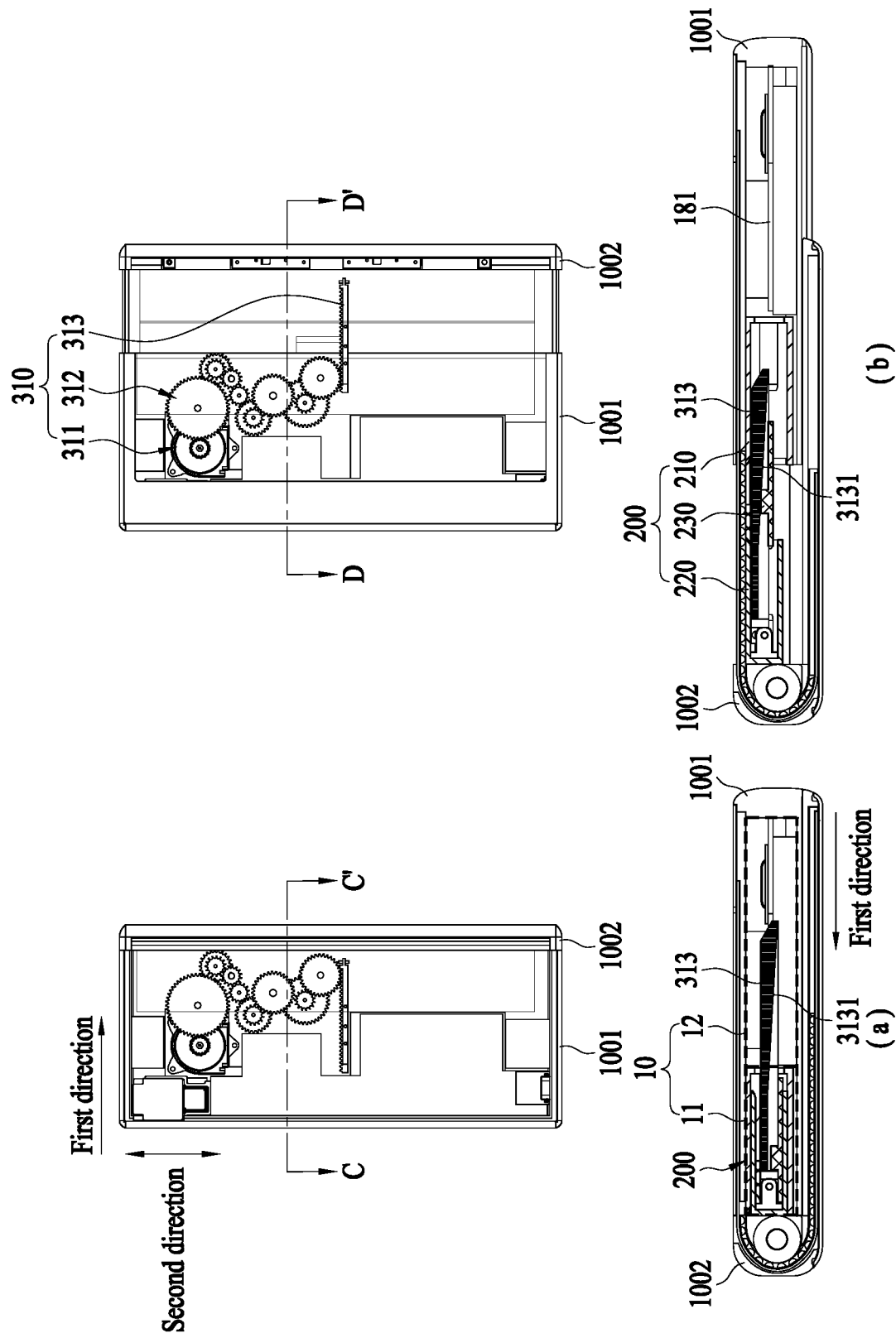

(a) of FIG. 11 illustrates a rear perspective view of a roll-slide mobile terminal and a cross-sectional view taken along C-C' of the roll-slide mobile terminal before an expansion of an expansion support part, and (b) of FIG. 11 illustrates a rear perspective view of the roll-slide mobile terminal and a cross-sectional view taken along D-D' of the roll-slide mobile terminal after an expansion of the expansion support part.

BEST MODE FOR CARRYING OUT THE INVENTION

Hereinafter, the example embodiments disclosed herein will be described in detail with reference to the accompanying drawings, but regardless of the numbers of drawings the same or similar components refer to the same reference numeral, and redundant description thereof will be omitted. The suffixes "module" and "part" for the components used in the following description are given or mixed in consideration of the ease of writing the specification, and do not have distinct meanings or roles by themselves. In addition, in describing the example embodiments disclosed in the specification, if it is determined that detailed description of related known technologies may obscure the gist of the example embodiments disclosed in the specification, the detailed description thereof will be omitted. In addition, the accompanying drawings are only for easy understanding of the example embodiments disclosed in the specification, and the technical idea disclosed herein is not limited by the accompanying drawings, and all modifications included in the scope of the present disclosure should be understood to include equivalents or substitutes.

The terms such as "first" and "second" as used herein may use corresponding components regardless of importance or an order and are used to distinguish a component from another without limiting the components. These terms may be used for the purpose of distinguishing one element from another element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element.

A singular expression includes a plural expression unless the context clearly dictates otherwise.

The terms "have," "may have,"" "include," and "may include" as used herein indicate the presence of corresponding features (for example, elements such as numerical values, functions, operations, or parts), and do not preclude the presence of additional features.

Figure 1:
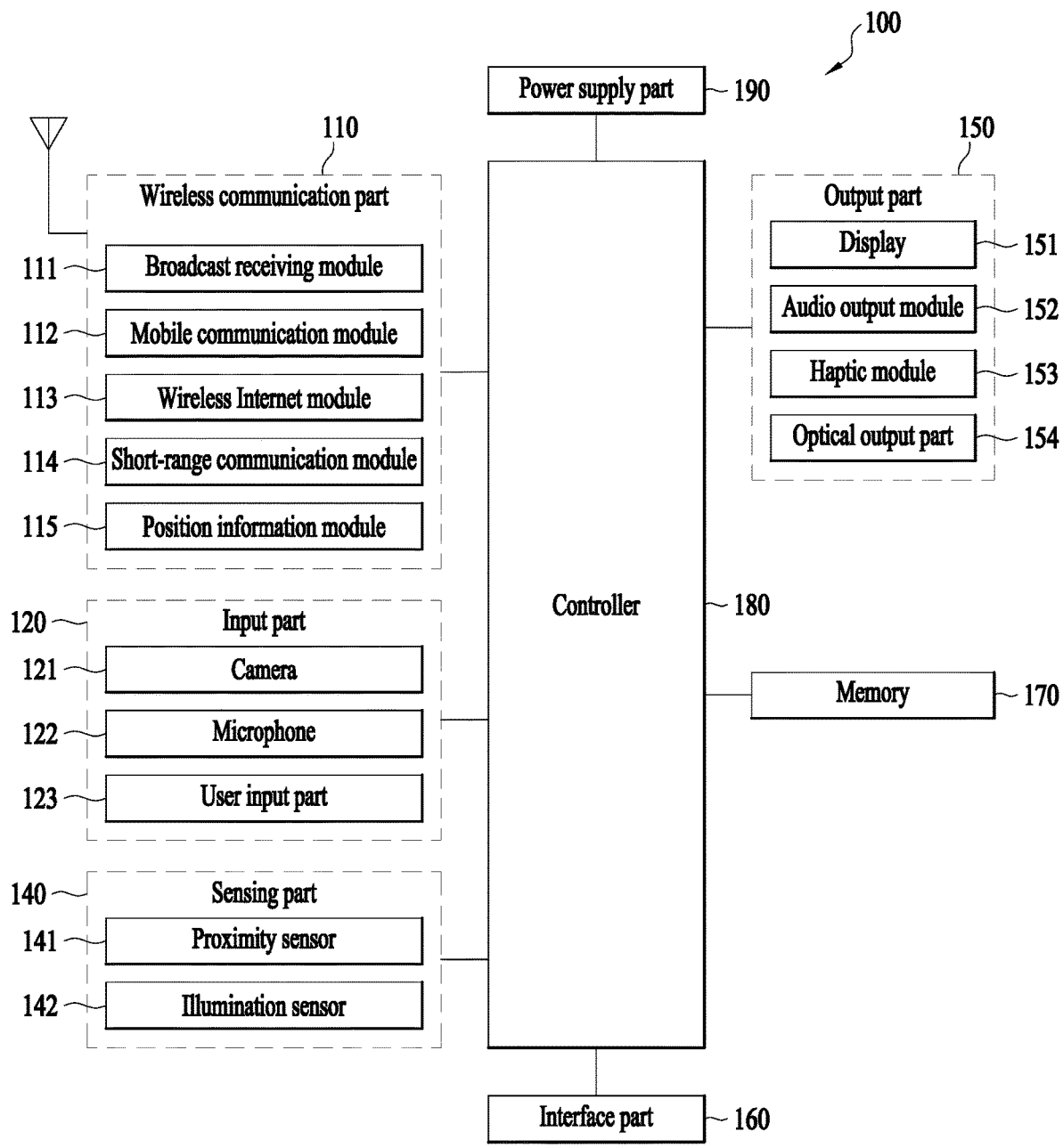
FIG. 1 is a block diagram illustrating a mobile terminal related to the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Further, the wireless communication unit 110 typically includes one or more modules which connect the mobile terminal 100 to one or more networks.

Such wireless communication unit 110 includes one or more of a broadcast receiving module 111, a mobile communication module 112, a wireless Internet module 113, a short-range communication module 114, and a location information module 115.

First, referring to the wireless communication unit 110, the broadcast reception module 111 of the wireless communication unit 110 receives a broadcast signal and/or broadcast related information from an external broadcast management server through a broadcast channel. The broadcast channel may include a satellite channel and a terrestrial channel. Two or more of the broadcast reception modules may be provided to the mobile terminal 100 for simultaneous broadcast reception or broadcast channel switching for at least two broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If necessary, the location information module 115 may perform any function of the other modules of the wireless communication unit 110 to obtain data on the location of the mobile terminal as a substitute or additionally. The location information module 115 is a module used to obtain the location (or current location) of the mobile terminal, and is not limited to a module that directly calculates or obtains the location of the mobile terminal.

The input unit 120 may be configured to permit various types of input to the mobile terminal 120. Examples of such input include audio, image, video, data, and user input. Image and video input is often obtained using one or more cameras 121.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

In addition, the controller 180 may control at least some of the components discussed with reference to FIG. 1 in order to drive an application program stored in the memory 170. Furthermore, in order to drive the application program, the controller 180 may operate at least two or more of the components included in the mobile terminal 100 in combination with each other.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

It is premised that the roll-slide mobile terminal 100 of the present disclosure is a bar shape, but it may be provided in another form within a range that does not contradict features of the present disclosure.

The roll-slide mobile terminal 100 of the present disclosure refers to the aforementioned mobile terminal to which a flexible display is applied. The flexible display refers to a display that may be bent so that a winding area may be varied.

The flexible display refers to a light and strong display that is not easily broken because it is manufactured on a thin and flexible substrate that may be curved, bent, folded, twisted or curled like paper while maintaining the characteristics of an existing flat panel display.

The flexible display may be combined with a touch sensor to implement a flexible touch screen. When a touch is made on the flexible touch screen, a controller may perform a control corresponding to the touch input.

The touch sensor detects a touch (or a touch input) applied to the touch screen by using at least one of various touch methods such as a resistive film method, an electrostatic capacitance method, an infrared method, an ultrasonic method and a magnetic field method.

As an example embodiment, the touch sensor may be configured to convert a change in pressure applied to a specific part of the touch screen or electrostatic capacitance generated in a specific part into an electrical input signal. The touch sensor may be configured to allow a touch object that applies a touch on the touch screen to detect a touch position on the touch sensor, an area, a pressure at the time of touch and electrostatic capacitance at the time of touch.

Further, the roll-slide mobile terminal 100 according to the modified example embodiment may be provided with a deformation detecting part configured to detect deformation of the flexible display. Such a deformation detecting part may be included in a sensing part.

The information related to the deformation may include a direction in which the flexible display is deformed, a deformation degree, a deformed position, a deformed time, and an acceleration at which the deformed flexible display is restored. In addition, the information may be various pieces of information detectable due to the curved flexible display.

In addition, based on the information related to the deformation of the flexible display detected by the deformation detecting part, the controller 180 may change information displayed on the flexible display, or generate a control signal that is to control a function of the roll-slide mobile terminal 100.

The state transformation of the flexible display (i.e., an expansion or a retraction of a front surface area) is not limited merely to a deformation by an external force. For example, the front surface area of the flexible display may be expanded or retracted by a command of a user or an application. In order to deform the flexible display without an external force as just described, a driving part may be included.

When the flexible display covers a rear surface as well as a front surface, a space in which an antenna implemented in an existing rear case may be mounted is limited. Therefore, the antenna may be implemented in the flexible display. An antenna on display (AOD) is a type of antenna in which a patterned electrode layer and a dielectric layer are layered to form a transparent film. The AOD may be implemented to be thinner than an antenna with laser direct structuring (LDS) technology implemented in the existing copper nickel plating method, and accordingly the AOD has the advantage of not being exposed to the exterior with little effect on the thickness.

The above-described display part 151 may be implemented as a flexible display, and the flexible display part 151 refers to a set of a plurality of panels including the flexible display that directly perform an output function. For example, the flexible display part 151 may include a flexible display and a touch screen, and the aforementioned property of the flexible display, which is the deformable property, is likewise applied to the flexible display part 151. It is premised that the display part 151 to be referred to below is the flexible display part 151 unless otherwise specified.

Figure 2:
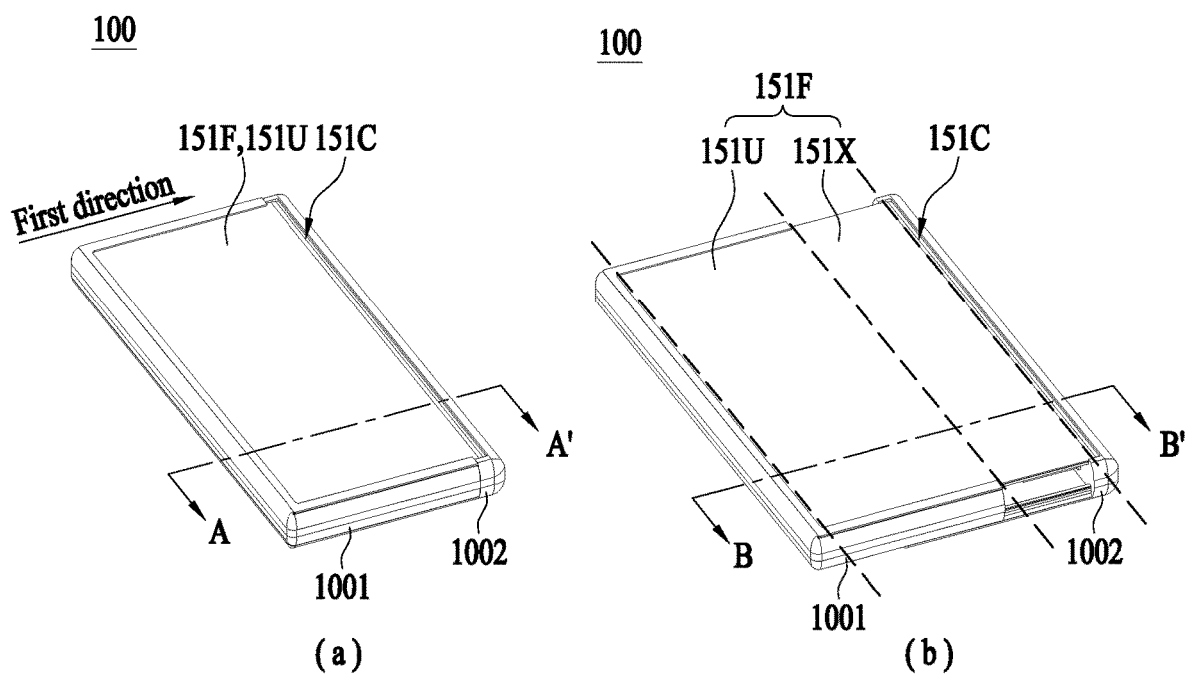
FIG. 2 illustrates front perspective views of a display part of a roll-slide mobile terminal according to another example embodiment of the present disclosure before and after it is expanded.
Figure 3:
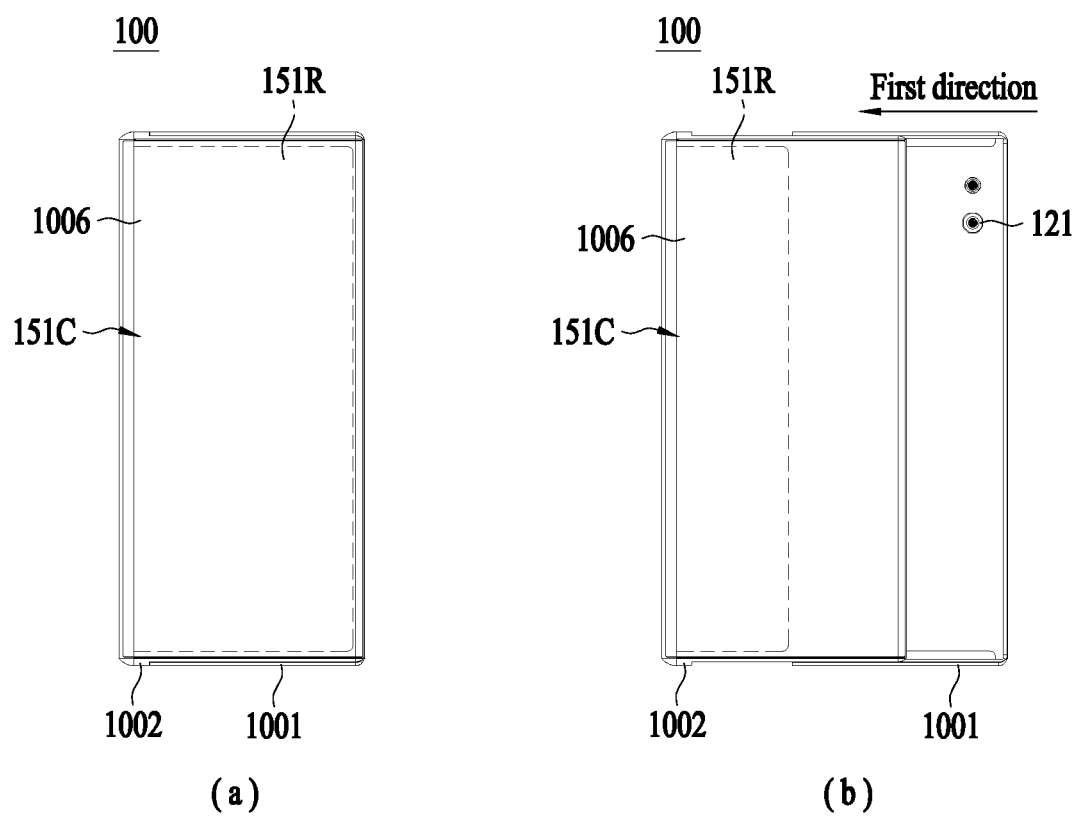
FIG. 3 illustrates rear views of a roll-slide mobile terminal before and after a display part is expanded according to an example embodiment of the present disclosure.

FIG. 2 illustrates front perspective views and FIG. 3 illustrates rear views of the display part 151 of the roll-slide mobile terminal 100 according to an example embodiment of the present disclosure before and after it is expanded.

The display part 151 may be provided with one side fixed at a front surface with respect to the roll-slide mobile terminal 100 and wound at a corner in the first direction over a rear surface. A front surface area 151F of the display part is expandable, and in this case, a rear surface area 151R of the display part is retracted. Conversely, when the front surface area 151F of the display part is retracted, the rear surface area 151R of the display part is expanded.

If the direction in which the front surface area 151F of the display part expands is defined as the first direction, as the front surface area 151F becomes wider, a winding area 151C of the display part 151 moves in the first direction, and as the front surface area 151F of the display part becomes narrower, the winding area 151C of the display part 151 moves in the direction opposite to the first direction.

In order to flexibly secure a space for an area of the display part 151 that varies, a frame provided with the display part 151 is also expanded and retracted. With regard to the frame, include are a first frame 1001 and a second frame 1002 that slidably moves with respect to the first frame 1001 in the first direction. When the front surface area 151F of the display part is expanded, the second frame 1002 slidably moves with respect to the first frame 1001 in the first direction, and when the front surface area 151F of the display part is retracted, the second frame 1002 slidably moves with respect to the first frame 1001 in the direction opposite to the first direction.

With regard to the front surface area 151F of the display part, an area continuously maintained regardless of an expansion and a retraction is defined as a fixed area 151U, and an area selectively exposed to the front according to the expansion or the retraction is defined as a variable area 151X. Based on a state where the front surface area 151F of the display part is expanded, the fixed area 151U of the display part is secured by the first frame 1001 and the variable area 151X of the display part is secured by the second frame 1002.

When the second frame 1002 slidably moves in the first direction and it expands from the first frame 1001, the surface area 151F of the display part also expands to expose the fixed area 151U and the variable area 151X to the front surface area. When the second frame 1002 slidably moves in the direction opposite to the first direction and it retracts from the first frame 1001, the front surface area 151F of the display part is also retracted, leaving only the fixed area 151U.

Figure 4:
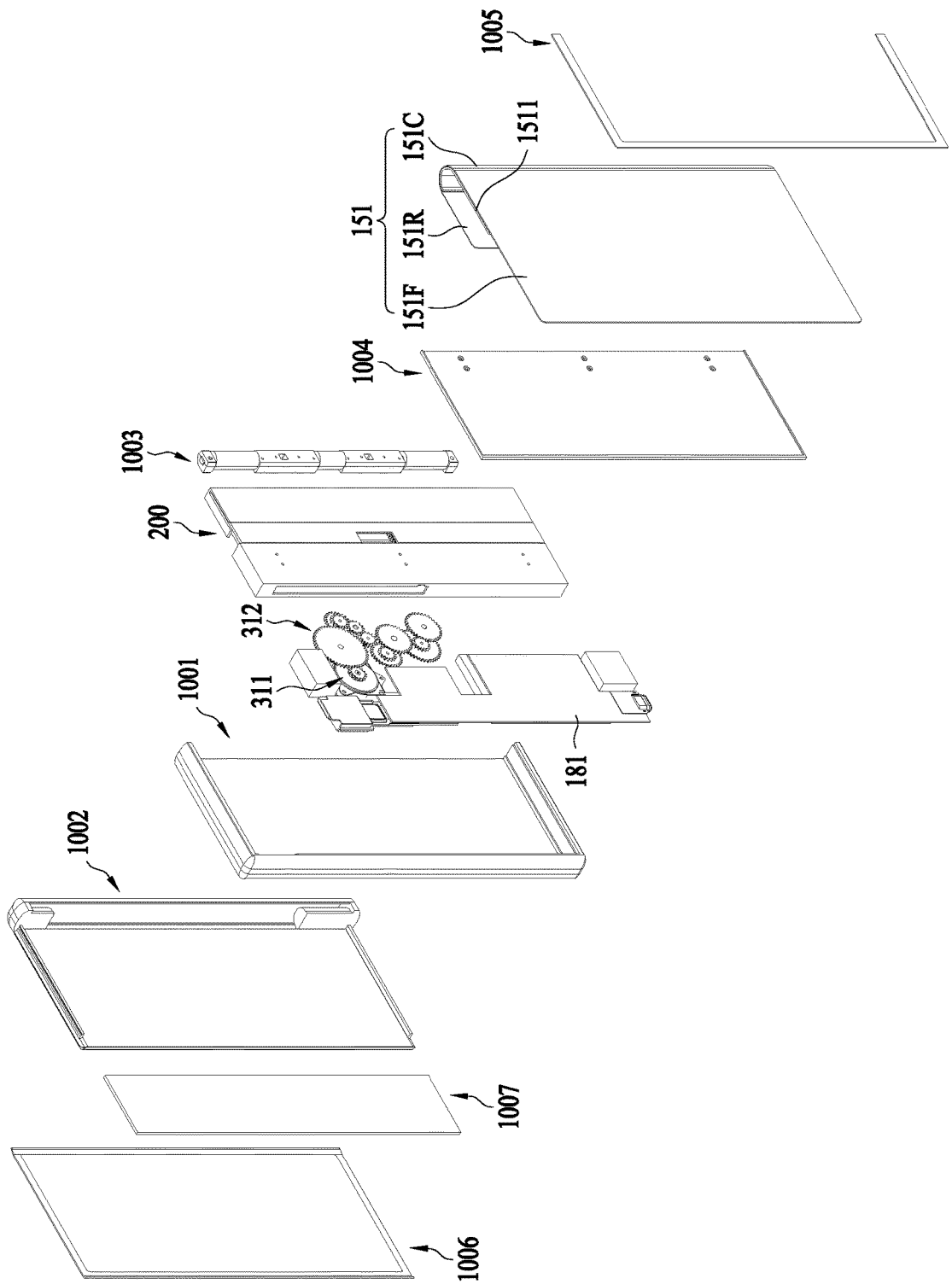
FIG. 4 is an exploded perspective view of a roll-slide mobile terminal related to the present disclosure.
Figure 5:
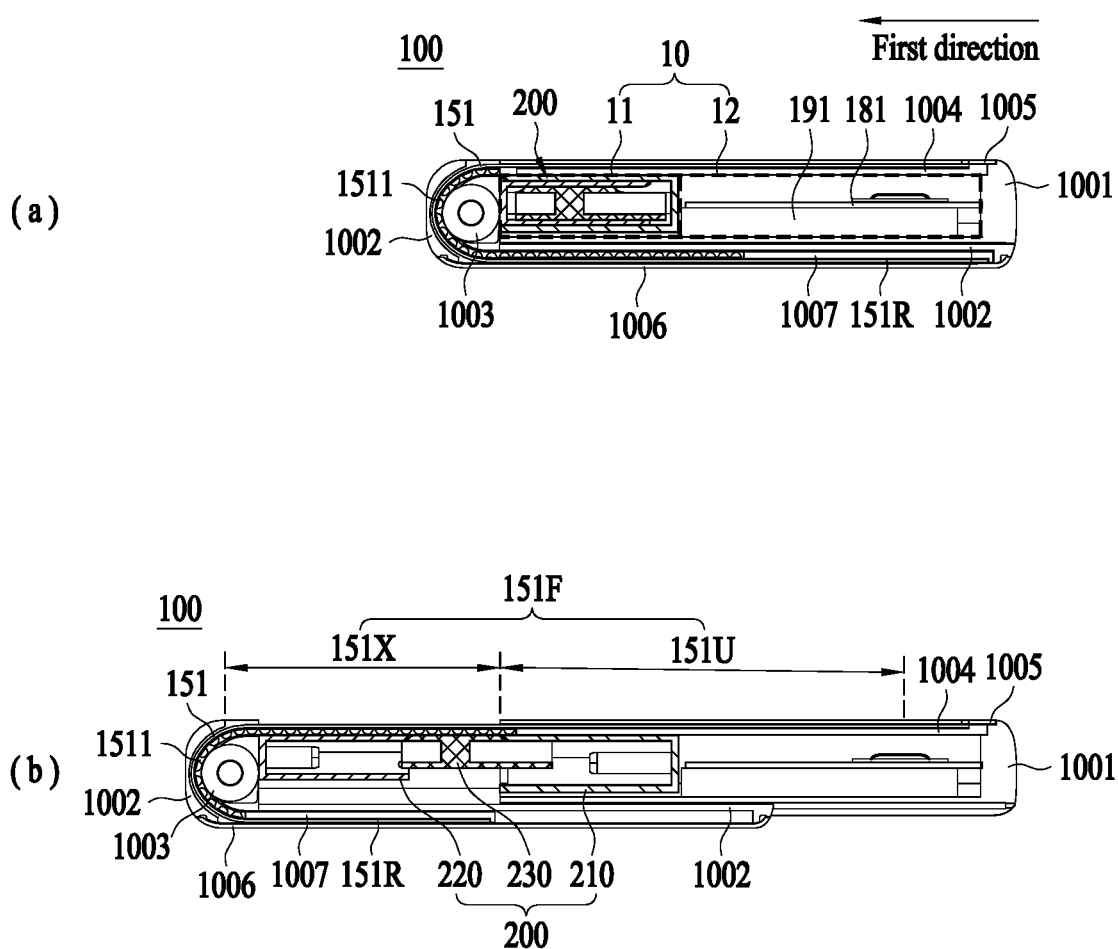
FIG. 5 illustrates cross-sectional views taken along A-A' and B-B' FIG. 2 for states before and after an expansion support part related to the present disclosure is expanded.

FIG. 4 is an exploded perspective view of the roll-slide mobile terminal 100 related to the present disclosure, and FIG. 5 illustrates cross-sectional views taken along A-A' and B-B' FIG. 2 for states before and after an expansion support part 200 related to the present disclosure is expanded.

A slider 1007 guides an expansion and a retraction of the front surface area 151F of the display part along with a roller 1003.

The roller 1003 directly expands and retracts the front surface area 151F of the display part, and the slider 1007 holds the display part 151 that is with weak rigidity to provide rigidity above a certain level, so that the entire display part 151 is stretched over the front surface area to a rear surface of the roll-slide mobile terminal 100 and at the same time, it allows the shape to be maintained even when moving.

When the front surface area 151F of the display part is expanded, the speed at which a rear surface area 151R of the display part is retracted is faster than the speed at which the second frame 1002 moves. Accordingly, the slider 1007 is provided to move with respect to the second frame 1002 without being fixed to the second frame 1002. The second frame 1002 is provided with a slider guide that is to guide the movement of the slider 1007. When the front surface area 151F of the display part is expanded, the slider 1007 slidably moves along the slider guide in the direction opposite to the first direction, and when the front surface area 151F is retracted, the slider 1007 slidably moves along the slider guide in the first direction. The slider guide may be formed on a rear surface of the second frame 1002.

The rear surface of the second frame 1002 may be covered by a rear window 1006 that is light transmissible. Since the rear surface area 151R of the display part and the slider 1007 move on the rear surface of the second frame 1002, the rear window 1006 protects this flexible structure.

Further, the front surface area 151F of the display part may be exposed to the front surface without a separate window. Meanwhile, a decorative frame may cover a boundary area between the front surface area 151F of the display part and the first frame 1001, so that the inflow of external substances may be prevented and the user's screen visibility may be helped by covering a bezel area of the roll-slide mobile terminal 100.

A main board 181 mounts electronic components that is to drive the roll-slide mobile terminal 100, for example, an application processor, the battery 191, the camera 121 and the like. Furthermore, some components of a driving part 310 to be described later may also be mounted. The main board 181 and the electronic components may be mounted in an electronic part 12 of an internal space 10 formed by the first frame 1001.

The roller 1003 is provided on the second frame 1002 and moves in the first direction along with the movement of the second frame 1002, and the roller simultaneously rotates and supports the winding area 151C of the display part to be unfolded or wound.

A back plate 1511 directly supported by the roller 1003 may be provided on at least one area of a rear surface of the display part 151. Corresponding surfaces of the roller 1003 and the back plate 1511 have shapes that engage with each other, so that the winding area 151C of the display part and the corresponding back plate 1511 area may move naturally by the rotation of the roller 1003. As an example embodiment, the roller 1003 and the back plate 1511 may be provided in the shape of a gear engaging with each other, and accordingly the winding area 151C of the display part may be moved by the movement and rotation of the roller 1003 so that the front surface area 151F of the display part may be expanded or retracted. The gear shape may in particular take a trapezoidal shape in which an inner side is shorter than an outer side.

In addition, the back plate 1511 serves as a structure that supports a rear surface of the display part 151. Since the fixed area 151U of the display part maintains a planar state, the fixed area 151U may be supported by the first frame 1001 or a middle frame 1004 coupled to and fixed to the first frame 1001, but the variable area 151X may not be supported in the same shape because the winding area 151C is varied by an expansion or a retraction of the display part 151. Accordingly, the variable area 151X of the display part may be supported by the back plate 1511 that is bendable. The back plate 1511 is provided over the variable area 151X of the display part to form the winding area 151C along with the display part 151, and may be provided wound around a rear surface of the roll-slide mobile terminal 100. The back plate 1511 may be bent due to its own material properties, but a material of the back plate 1511 may be a rigid material that does not bend, and may be formed in the form of segmented and connected chains (e.g., a watch band) and may be bent.

However, since the back plate 1511 is also bent, there is a problem in that the supporting force supporting the display part 151 is not sufficient.

The expansion support part 200 is provided inside the roll-slide mobile terminal 100 of the present disclosure to expand or retract in response to an expansion or a retraction of the display part 151. Accordingly, in a state in which the display part 151 is retracted, the expansion support part 200 is retracted to support the fixed area 151U of the display part, and in a state in which the display part 151 is expanded, the expansion support part 200 is expanded to support the fixed area 151U and the variable area 151X of the display part.

The expansion support part 200 may be provided in a space 11 of the internal space 10 formed by the first frame 1001 and the second frame 1002, and in a remaining area 12 of the internal space 10, an electronic part is formed so that electronic components required to drive the roll-slide mobile terminal 100 may be mounted. To be more specific, the internal space 10 may refer to a space surrounded by the first frame 1001, the second frame 1002, the middle frame 1004 and the back plate 1511.

To be more specific, the expansion support part 200 may include the main member 210, a middle member 230 drawn out from the main member 210 and a sub member 220. When the middle member 230 or the sub member 220 is drawn out, it means an expansion of the expansion support part 200, and when the middle member 230 or the sub member 220 is drawn in, it means a retraction of the expansion support part 200.

The main member 210 of the expansion support part 200 supports the fixed area 151U of the display part, and the middle member 230 or the sub member 220 supports the variable area 151X of the display part. Accordingly, the middle member 230 and the sub member 220 may be fully drawn into the main member 210 in a state in which the front surface area 151F of the display part is not expanded, and the middle member 230 and the sub member 220 may be fully drawn out from the main member 210 in a state in which the front surface area 151F is fully expanded.

Figure 6:
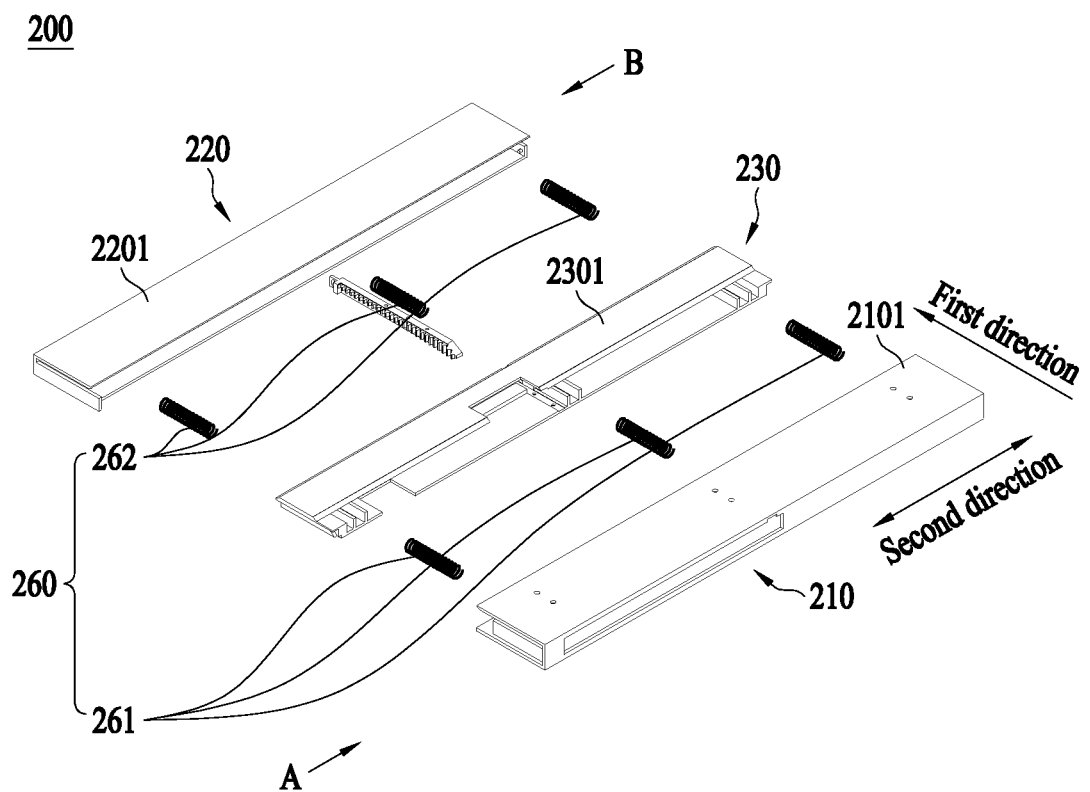
FIG. 6 is an exploded perspective view of an expansion support part according to the present disclosure.
Figure 7:
FIG. 7 illustrates side views sequentially showing a process in which an expansion support part related to the present disclosure is expanded.
Figure 7:
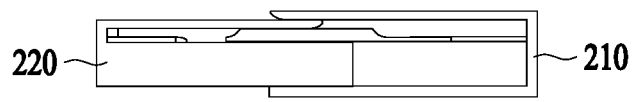
Figure 7:
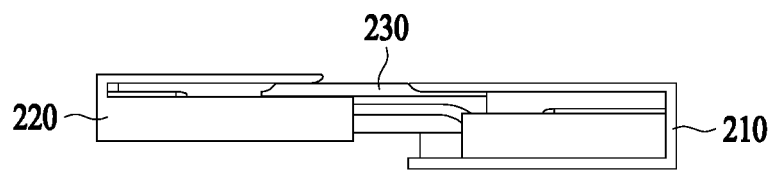
Figure 7:
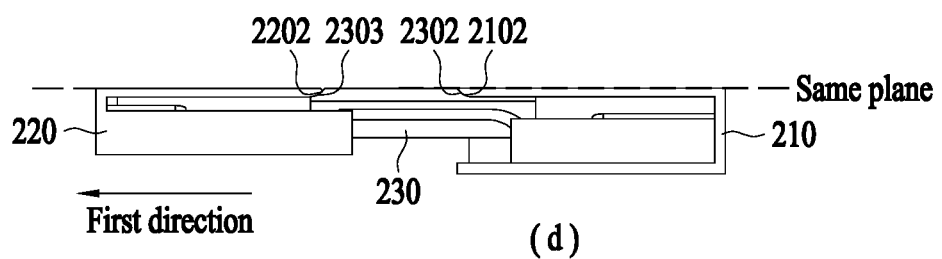
Figure 8:
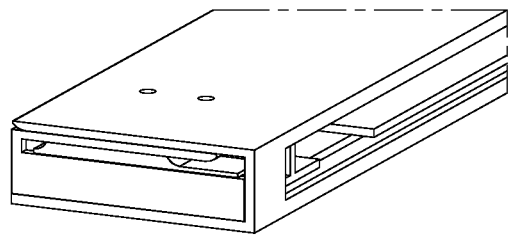
FIG. 8 illustrates front perspective views sequentially showing a process in which an expansion support part related to the present disclosure is expanded.
Figure 8:
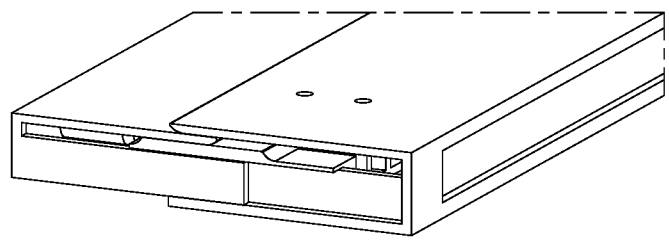
Figure 8:
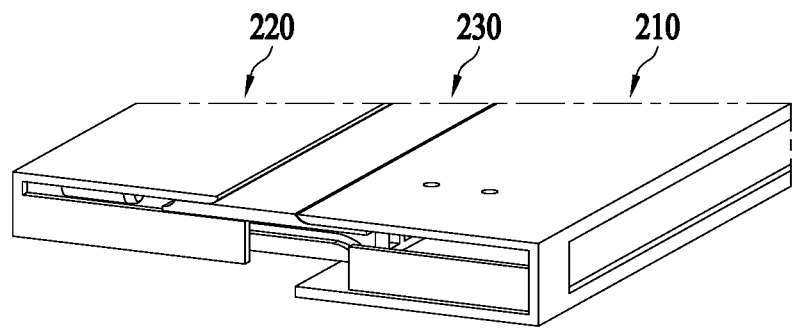
Figure 8:
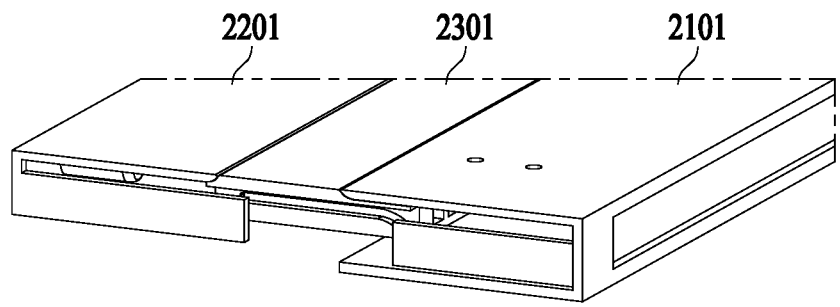

FIG. 6 is an exploded perspective view of the expansion support part 200, and FIGS. 7 and 8 are a side view and a front perspective view sequentially illustrating a process in which the expansion support part 200 related to the present disclosure is expanded.

The main member 210, the middle member 230 and the sub member 220 may each have supporting surfaces 2101, 2201 and 2301 of each plate in order to support a rear surface of the front surface area 151F (see FIG. 5) of the display part. With regard to the expansion support part 200, the supporting surfaces 2101, 2201 and 2301 of each member's plate may directly or indirectly support the rear surface of the front surface area 151F (see FIG. 5) of the display part.

As shown in (a) of FIG. 7 or (a) of FIG. 8, when not supporting the rear surface of the front surface area 151F (see FIG. 5) of the display part, the middle member 230 and the sub member 220 are provided by being drawn into the inside of the main member 210. In particular, the sub member 220 may be drawn into the inside of the main member 210, and the middle member 230 may be drawn into the inside of the sub member 220.

In order to implement the above features, the main member 210 and the sub member 220 may have a rectangular parallelepiped case shape in which surfaces facing each other in the retracting direction are open. That is, the main member 210 may have an open surface provided in the first direction so that the sub member 220 may be located in an internal space of the main member 210, and the sub member 220 may have an open surface provided in the direction opposite to the first direction so that the middle member 230 may be located in an internal space of the sub member 220.

In particular, in a state in which the middle member 230 and the sub member 220 are both drawn in, the expansion support part 200 causes all three members to overlap, and accordingly, the area supporting the display part 151 when the expansion support part 200 is expanded may be maximized compared to the space occupied when the expansion support part 200 is retracted. That is, the width of the inner space of the main member 210 in the first direction may be the same as the maximum width of the outer boundary of the sub member 220 in the first direction, and the width of the inner space of the sub member 220 in the first direction may be the same as the maximum width of the outer boundary of the middle member 230 in the first direction. Through this, the space 11 occupied by the expansion support part 200 may be minimized in comparison to the internal space 10 of the roll-slide mobile terminal 100 and a space 12 occupied by the electronic part may be maximized, and thus the internal space 10 may be used efficiently.

Figure 9:
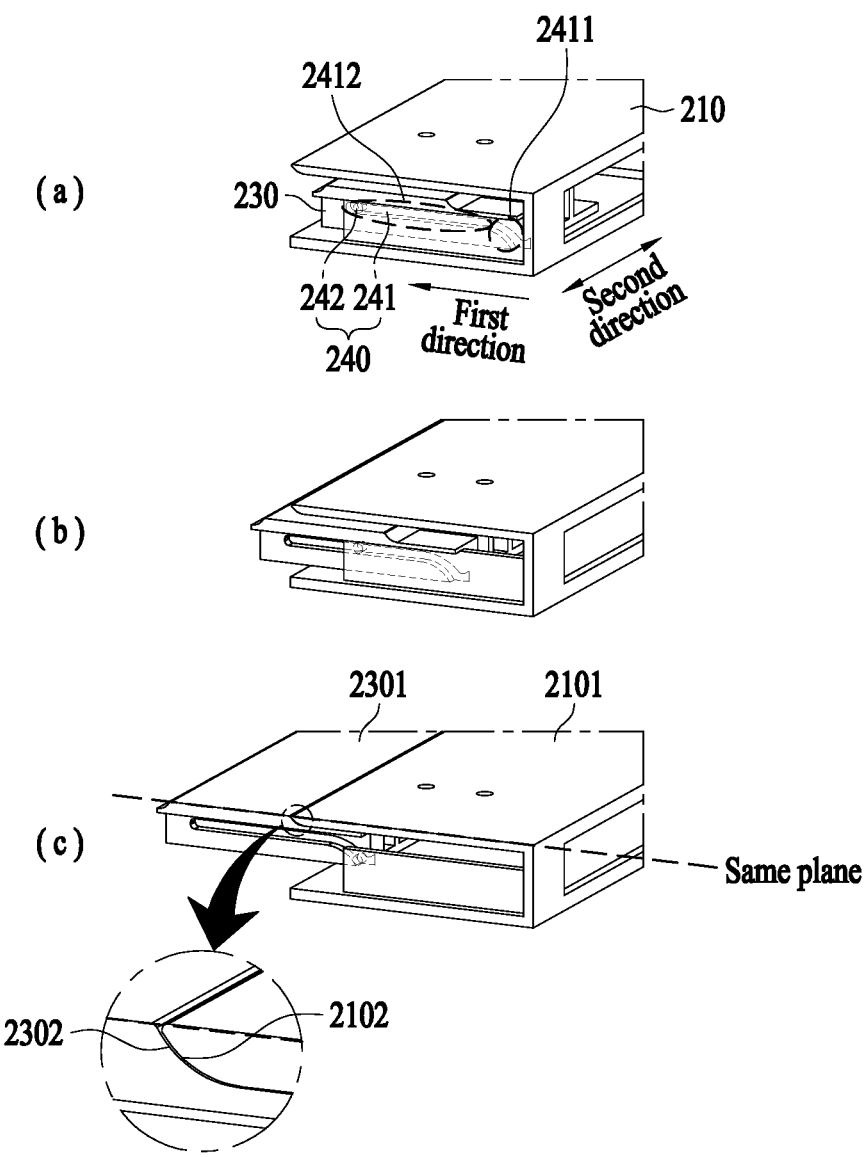
FIG. 9 illustrates views sequentially showing a process in which a middle member is drawn out from a main member 210 in a state viewed from a direction A of FIG. 6.
Figure 10:
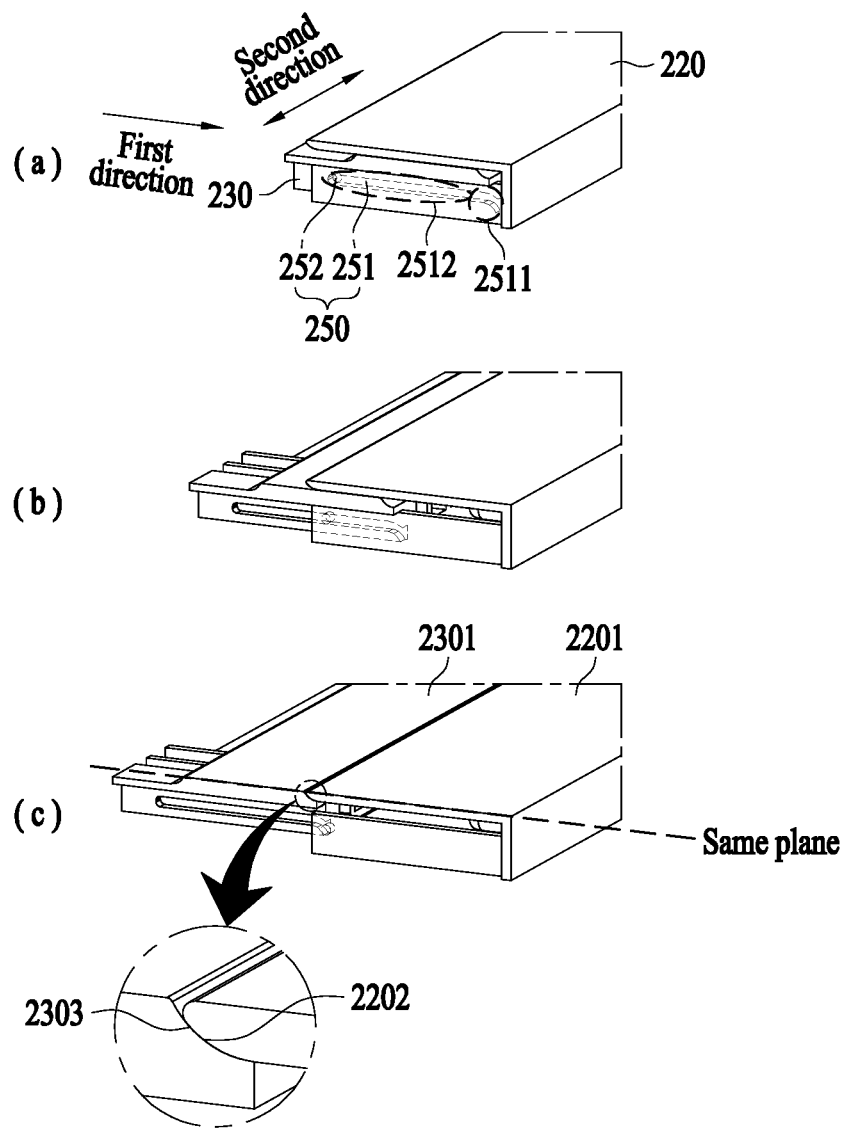
FIG. 10 illustrates views sequentially showing a process in which a middle member is drawn out from a sub member in a state viewed from a direction B of FIG. 6.

FIG. 9 illustrates a process in which the middle member 230 is drawn out from the main member 210 in a state viewed from the direction A of FIG. 6, and FIG. 10 sequentially illustrates a process in which the middle member 230 is drawn out from the sub member 220 in a state viewed from the direction B of FIG. 6.

The expansion support part 200 may include guide parts 240 and 250 that are to guide the drawing out or drawing in of the middle member 230 or the sub member 220. A first guide part 240 guides relative movement between the main member 210 and the middle member 230, and a second guide part 250 guides relative movement between the sub member 220 and the middle member 230.

To implement the guide structure, the first guide part 240 is provided on facing surfaces of the main member 210 and the middle member 230, and the second guide part 250 is provided on facing surfaces of the sub member 220 and the middle member 230.

The guide structure may be implemented through a guide rail and a protrusion moving along the guide rail. The first guide part 240 includes a first guide rail 241 and a first protrusion 242, and the second guide part 250 includes a second guide rail 251 and a second protrusion 252. The first guide rail 241 is provided on facing surfaces of any one of the main member 210 and the middle member 230, and the first protrusion 242 is provided on facing surfaces of the other. The second guide rail 251 is provided on facing surfaces of any one of the sub member 220 and the middle member 230, and the second protrusion 252 is provided on facing surfaces of the other.

In particular, the first guide part 240 and the second guide part 250 may be respectively provided on one side and the other side in the second direction (that is, the longitudinal direction of the bar-shaped roll-slide mobile terminal 100) that is perpendicular to the first direction and parallel to the front surface area 151F of the display part. In other words, the first guide part 240 may be provided on side surfaces of the rectangular parallelepiped case perpendicular to the second direction, and the second guide part 250 may be provided on the other side surfaces of the rectangular parallelepiped case perpendicular to the second direction. This is to easily implement the shape of curved parts 2411 and 5211, which will be described later.

In order for the guide rail and the protrusion mutually contact, a side surface on which the first guide part 240 is provided is adjacent to each side surface of the main member 210 and the middle member 230. The other side surface on which the second guide part 250 is provided is adjacent to each side surface of the sub member 220 and the middle member 230.

Each of the guide rails 241 and 251 may include linear areas 2412 and 2512 straight in the first direction and the curved parts 2411 and 5211 that are bent at ends of the linear areas 2412 and 2512 in the thickness direction of the roll-slide mobile terminal 100. In the linear areas 2412 and 2512, one member may move from the other member only in the first direction, and may move in the first direction and the thickness direction in the curved parts 2411 and 2511. The curved parts 2411 and 2511 allow one member to move in thickness direction with respect to the other member as each member is drawn out.

Referring to FIG. 5 together, as an example embodiment regarding the member moving to the thickness direction, when the expansion support part 200 is expanded, the supporting surfaces 2101, 2201 and 2301 of each member may form the same plane. Each of the members 210, 220 and 230 forming the same plane forms the expansion support part 200 which forms a flat front surface, so that front surface area 151F of the display part is evenly supported. Meanwhile, this corresponds to a case in which each rear surface of the above-described back plate 1511 and middle frame 1004 forms the same plane. If each rear surface of the back plate 1511 and the middle frame 1004 forms a step difference, the supporting surfaces 2101, 2201 and 2301 of each member of the expansion support part 200 may be in close contact with the rear surface of the display part 151 for support by compensating for the step difference (not illustrated).

Supporting-surface boundaries 2102, 2202, 2302 and 2303 of the expansion support part 200, which form the same plane when expanded, have a shape corresponding to each other, so that when the expansion support part 200 is fully expanded, the supporting-surface boundaries 2102, 2202, 2302 and 2303 may be interlocked and fixed to fit.

In particular, when the supporting-surface boundaries 2102, 2202, 2302 and 2303 do not meet vertically but meet with an inclined surface or a curved surface, the boundaries of each member may be engaged with each other, and thus it may be helpful for the supporting surfaces 2101, 2201 and 2301 of each member form the same plane.

In particular, when the supporting-surface boundaries 2202 and 2303 of the sub member 220 and the middle member 230 meet with an inclined surface or an inclined and curved surface, when each member forming the same plane is drawn in and the expansion support part 200 is retracted, it may be drawn in again naturally without being caught. At this time, since a supporting surface 2201 of the sub member 220 would be drawn in so as to be located lower than a supporting surface 2301 of the middle member 230, a lower portion of a supporting-surface boundary 2303 of the middle member 230 may be an inclination to protrude toward the sub member 220, and correspondingly, an upper portion of a supporting-surface boundary 2202 of the sub member 220 may have a reverse inclination to protrude toward the middle member 230.

Referring to FIG. 6, the expansion support part 200 includes an elastic body 260 such as a spring to guide the maximum expansion of the expansion support part 200 and assist the force to maintain it. That is, since the supporting surfaces 2101, 2201 and 2301 do not form the same plane before each member is fully drawn out, the elastic body 260 helps each member of the expansion support part 200 to be fully drawn out so that each of the supporting surfaces 2101, 2201 and 2301 may form the same plane, and after forming the same plane, the elastic body 260 provides force to help maintain it.

The elastic body 260 includes a first elastic body 261 that is compressed in the first direction between the main member 210 and the middle member 230, and includes a second elastic body 262 that is compressed in the first direction between the middle member 230 and the sub member 220.

The first elastic body 261 and the second elastic body 262 may provide an elastic restoring force in a direction in which the expansion support part 200 is expanded, and accordingly assist the force used by the driving part 310, which will be described later, expanding the expansion support part 200 and thus power consumption may be reduced. It also helps structural stability that maintains the expanded state after the expansion support part 200 is expanded so that it is not retracted even if a retraction is tried with an external force, unless a certain degree of force is applied.

Each of the elastic bodies 261 and 262 may be provided in plurality in a second direction (that is, the longitudinal direction of the terminal) that is perpendicular to the first direction and parallel to the front surface area 151F of the display part to provide stability by preventing force transmission being biased to one side.

(a) of FIG. 11 illustrates a rear perspective view of the roll-slide mobile terminal 100 and a cross-sectional view taken along C-C' of the roll-slide mobile terminal 100 before an expansion of the expansion support part 200, and (b) of FIG. 11 illustrates a rear perspective view of the roll-slide mobile terminal 100 and a cross-sectional view taken along D-D' of the roll-slide mobile terminal 100 after an expansion of the expansion support part 200.

The expansion support part 200 may be expanded or retracted by the driving part 310. The driving part 310 may be provided in the form of an actuator including a motor 311 and may be driven by an expansion signal or a retraction signal generated by the controller. The expansion signal corresponds to an expansion of the front surface area 151F of the display part, and the retraction signal corresponds to a retraction of the front surface area 151F of the display part.

The driving part 310 provides a force by which the expansion support part 200 may be expanded in the first direction, which is the direction in which the sub member 220 is drawn out.

The driving part 310 may include a driving motor 311 that rotates by receiving power, a gear part 312 that transmits the rotational force of the driving motor 311 to an appropriate position with an appropriate gear ratio, and a gear rack 313 that converts a rotational motion of the gear part 312 into a linear motion.

The driving motor 311 and the gear part 312 whose positions are fixed are fixed to the first frame 1001 side in the roll-slide mobile terminal 100, that is, to a non-variable member, and the gear rack 313 is fixed to the second frame 1002 side, that is, a variable member.

To be more specific, the driving motor 311 and the gear part 312 are fixed to the first frame 1001 through the main board 181 (main-PCB), and the main member 210 of the expansion support part 200 is fixed to the first frame 1001 through the middle frame 1004. Meanwhile, the gear rack 313 is fixed to the sub member 220 of the expansion support part 200. The gear rack 313 is moved by the driving of the driving part 310, and the sub member 220 is moved at the same time to expand or retract the expansion support part 200.

Further, the sub member 220 of the expansion support part 200 is fixed to the second frame 1002, and the driving force of the driving part 310 expands or retracts the second frame 1002 and furthermore the front surface area 151F of the display part.

For movement of the sub member 220 and the second frame 1002 in the first direction, the gear rack 313 is provided straight in the first direction. In particular, the gear rack 313 may be provided in the vicinity of the center of the expansion support part 200 with respect to the second direction to evenly transmit the force to the sub member 220.

In addition, the driving motor 311 and the gear part 312 may use a part of the internal space of the expansion support part 200 to secure the space for the electronic part to the maximum.

The gear rack 313 may form a slope 3131 in an area corresponding to the curved parts 2411 and 5211 of the guide part. That is, the sub member 220 moves upward in the thickness direction than the main member 210 due to the shape of the curved parts 2411 and 2511 during the drawing-out process, and due to this movement, a position change in the thickness direction occurs between the gear rack 313 and the gear. The gear rack 313 fixed to the sub member 220 forms the slope 3131 downward in the area corresponding to the curved parts 2411 and 5211, so that even when the gear par 312 descends, a stable contact may be maintained.

MODE FOR CARRYING OUT THE INVENTION

The above detailed description should not be construed as limiting in all aspects and should be considered as illustrative. The scope of the disclosure should be determined by reasonable interpretation of the appended claims, and all changes within the equivalent scope of the disclosure are included in the scope of the disclosure.

INDUSTRIAL APPLICABILITY

Some of or all the above-described features may be applied to the field corresponding to the mobile terminal related to the present disclosure.

The invention claimed is:

1. A roll-slide mobile terminal comprising:
a first frame;
a second frame configured to slidably move in a first direction with respect to the first frame;
a display part configured to be flexible, having a front surface provided on a front surface of the first frame, wound at an end portion in a first direction of the second frame, and provided over a rear surface of the second frame, wherein a front surface area is expanded or retracted in response to a movement of the second frame; and
an expansion support part configured to expand in the first direction in response to an expansion of the front surface area of the display part to support the front surface area of the display part,
wherein the expansion support part comprises:
a main member including a supporting surface that supports a rear surface of the front surface area of the display part;
a middle member that is drawn out from the main member in the first direction and includes a supporting surface that supports a rear surface of the front surface area of the display part; and
a sub member that is drawn out from the middle member in the first direction and includes a supporting surface that supports a rear surface of the front surface area of the display part.

2. The roll-slide mobile terminal of claim 1, wherein the front surface area of the display part comprises:
a fixed area that is maintained at a front surface regardless of an expansion or a retraction of the front surface area; and
a variable area that varies according to an expansion or a retraction of the front surface area, and
wherein the main member supports the fixed area, and the middle member or the sub member supports the variable area.

3. The roll-slide mobile terminal of claim 2, wherein the main member and the sub member are in a shape of a rectangular parallelepiped case in which surfaces facing each other in a mutually drawing-in direction are opened, the sub member is drawn into a space formed by the main member, and the middle member is drawn into a space formed by the sub member.

4. The roll-slide mobile terminal of claim 3, wherein the expansion support part further comprises:
a first guide part including a first guide rail and a first protrusion provided on facing surfaces of the main member and the middle member to guide drawing-out of the middle member; and
a second guide part including a second guide rail and a second protrusion provided on facing surfaces of the sub member and the middle member to guide drawing-out of the sub member.

5. The roll-slide mobile terminal of claim 4, further comprising:
a middle frame coupled and fixed to the first frame to support the fixed area; and
a back plate that is bendable and supports the variable area, wherein a rear surface forms a same plane as a rear surface of the middle frame,
wherein the first guide rail and the second guide rail include a curved part that is bent in a thickness direction, so that when the sub member is fully drawn out, supporting surfaces of the main member, the middle member and the sub member form a same plane to support the rear surface of the middle frame and a rear surface of the back plate.

6. The roll-slide mobile terminal of claim 5, further comprising a roller that is provided in the second frame to move along with the second frame and rotates while supporting a wound area of the display part.

7. The roll-slide mobile terminal of claim 6, further comprising a slider that is fixed to a rear surface area of the display part and slidably moves on the second frame according to an expansion or a retraction of the front surface area of the display part.

8. The roll-slide mobile terminal of claim 5, wherein, in a state that the sub member and the middle member are fully drawn out, adjacent boundaries of supporting surfaces of the respective members have inclined surfaces or inclined and curved surfaces corresponding to each other.

9. The roll-slide mobile terminal of claim 5, further comprising a driving part that provides a force to draw out the sub member from the main member,
wherein the driving part comprises:
a driving motor and a gear part provided in the first frame; and
a gear rack provided in the sub member and engages with the gear part, and
the gear rack forms a slope in an area corresponding to the curved part.

10. The roll-slide mobile terminal of claim 4, wherein, in a second direction perpendicular to the first direction and parallel to the front surface area of the display part, the first guide part is provided on one side in the second direction, the second guide part is provided on another side in the second direction, the middle member and the main member are provided on the one side to be adjacent to each other, and the middle member and the sub member are provided on the another side to be adjacent to each other.

11. The roll-slide mobile terminal of claim 1, further comprising:
- a driving part configured to provide a force to draw out the sub member from the main member,
- wherein the driving part comprises:
- a driving motor and a gear part provided in the first frame; and
- a gear rack that is provided in the first direction in the sub member to engage with the gear part and converts a rotational motion of the gear part into a linear motion, and
- the main member is fixed to the first frame and the second frame is fixed to the sub member.

12. The roll-slide mobile terminal of claim 11, wherein the expansion support part further comprises:
- a first elastic body compressed in the first direction and disposed between the main member and the middle member; and
- a second elastic body compressed in the first direction and disposed between the middle member and the sub member.

13. The roll-slide mobile terminal of claim 12, wherein the first elastic body and the second elastic body are each provided in plural in a second direction perpendicular to the first direction and parallel to the front surface area of the display part.

14. The roll-slide mobile terminal of claim 1, wherein the expansion support part is provided in an area of an internal space formed by the first frame and the second frame, and an electrical part is formed within a remaining area of the internal space.

* * * * *